United States Patent
Lewis et al.

(10) Patent No.: US 8,706,314 B2
(45) Date of Patent: Apr. 22, 2014

(54) METHOD AND APPARATUS FOR REGULATING TEMPERATURE IN A COMPUTER SYSTEM

(75) Inventors: Andrew J. Lewis, Litchfield, NH (US); Aleksey M. Urmanov, San Diego, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 789 days.

(21) Appl. No.: 12/183,572

(22) Filed: Jul. 31, 2008

(65) Prior Publication Data

US 2010/0030394 A1    Feb. 4, 2010

(51) Int. Cl.
G05D 23/00 (2006.01)
G01M 1/38 (2006.01)
G05B 13/00 (2006.01)
G05B 15/00 (2006.01)

(52) U.S. Cl.
USPC .............................. 700/300; 700/299; 700/276

(58) Field of Classification Search
USPC .......................................... 700/300, 299, 276
See application file for complete search history.

(56) References Cited

U.S. PATENT DOCUMENTS

| | | | | |
|---|---|---|---|---|
| 5,559,673 | A * | 9/1996 | Gagnon et al. | 361/695 |
| 6,276,311 | B1 * | 8/2001 | Reineking et al. | 123/41.01 |
| 6,349,269 | B1 * | 2/2002 | Wallace, Jr. | 702/132 |
| 2002/0140389 | A1 * | 10/2002 | Ohki et al. | 318/471 |
| 2003/0050738 | A1 * | 3/2003 | Masticola et al. | 700/291 |
| 2003/0178069 | A1 * | 9/2003 | Myles | 137/557 |
| 2004/0182545 | A1 * | 9/2004 | Payne | 165/80.4 |
| 2005/0172650 | A1 * | 8/2005 | Hermerding | 62/178 |
| 2005/0273208 | A1 * | 12/2005 | Yazawa et al. | 700/299 |
| 2006/0013281 | A1 * | 1/2006 | Sri-Jayantha et al. | 374/163 |
| 2006/0111816 | A1 * | 5/2006 | Spalink et al. | 700/276 |
| 2007/0042117 | A1 * | 2/2007 | Kuppurao et al. | 427/248.1 |
| 2007/0171613 | A1 * | 7/2007 | McMahan et al. | 361/695 |
| 2008/0059111 | A1 * | 3/2008 | Sri-Jayantha et al. | 702/132 |
| 2008/0147363 | A1 * | 6/2008 | Dalton et al. | 703/5 |
| 2008/0278905 | A1 * | 11/2008 | Artman et al. | 361/685 |
| 2009/0222145 | A1 * | 9/2009 | Larsen et al. | 700/299 |

OTHER PUBLICATIONS

Yang et al., Dynamic Thermal Management through Task Scheduling, Apr. 2008, IEEE, pp. 191-201.*

* cited by examiner

Primary Examiner — Kavita Padmanabhan
Assistant Examiner — Jason Lin
(74) Attorney, Agent, or Firm — Park, Vaughan, Fleming & Dowler LLP; Steven E. Stupp

(57) ABSTRACT

Embodiments of a system for regulating temperature in a computer system are described. During operation, the system estimates a thermal trajectory as a function of time in at least a portion of the computer system. Then, the system modifies a flow resistance of a cooling mechanism in a thermal-regulation system in the computer system based on the estimated thermal trajectory, where the flow resistance is modified to regulate a temperature of at least the portion of the computer system.

16 Claims, 6 Drawing Sheets

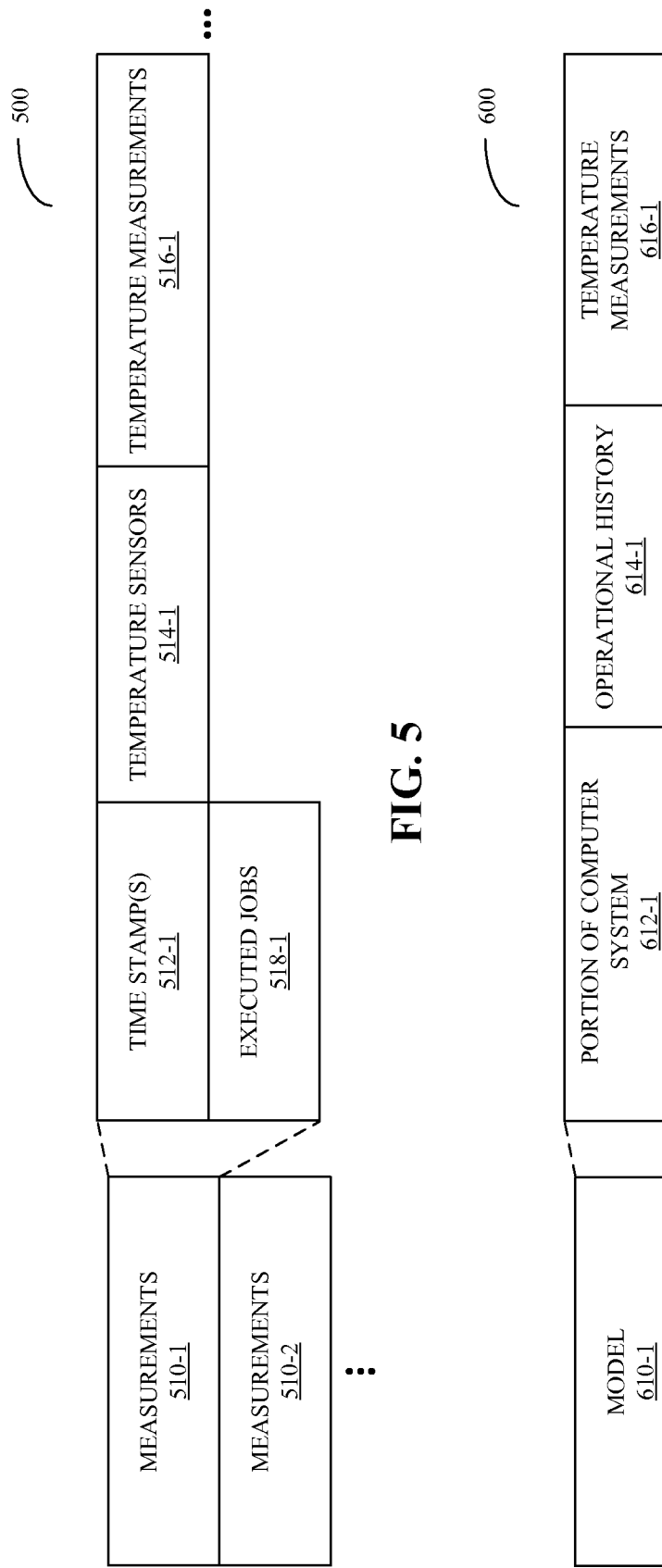

METHOD AND APPARATUS FOR REGULATING TEMPERATURE IN A COMPUTER SYSTEM

RELATED APPLICATIONS

This application is related to pending U.S. patent application entitled "Method and Apparatus for Controlling Temperature Variations in a Computer System," by Kenny C. Gross, Ayse K. Coskun, Keith A. Whisnant and Aleksey M. Urmanov, having Ser. No. 12/102,245, filing date Apr. 14, 2008, the contents of which are hereby incorporated by reference.

BACKGROUND

1. Field of the Invention

The present invention relates to techniques for regulating the temperature in computer systems. More specifically, the present invention relates to techniques for regulating temperature in computer systems by adjusting an iris opening(s) of one or more fluid ports.

2. Related Art

As semiconductor integration densities within computer systems continue to increase at an exponential rate, thermal dissipation problems are becoming increasingly problematic. In particular, as the operating temperatures of chip packages become higher, thermal cycling effects can begin to adversely affect the reliability of computer-system components. A number of degradation mechanisms are accelerated by thermal cycling at high temperatures, including: accelerated solder fatigue, interconnect fretting, differential thermal expansion between bonded materials, delamination failures, thermal mismatches between mating surfaces, differentials in the coefficients of thermal expansion between materials used in chip packages, wirebond shear and flexure fatigue, passivation cracking, electromigration failures, electrolytic corrosion, thermomigration failures, crack initiation and propagation, delamination between chip dies and molding compounds, delamination between the molding compound and the leadframe, die de-adhesion fatigue, repeated stress reversals in brackets leading to dislocations, cracks and eventual mechanical failures, and/or deterioration of connectors through elastomeric stress relaxation in polymers.

These problems can be addressed by reducing the thermal cycling associated with customer workload variations using existing techniques, such as 'chip throttling' and/or 'trash burning.' During chip throttling, chip temperatures are reduced by decreasing processor clock frequencies when customer workloads are high. Similarly, during trash burning, chip temperatures are increased by increasing processor activity when customer workloads are low.

However, when chip throttling is activated, the computer-system throughput is reduced when a customer application needs it the most (i.e., when customer workload is high). Moreover, this can create a so-called 'snowball' effect because, when application demand is high, throughput slows down, which can cause application demand to pile up, which can cause throughput to slow down even further. Additionally, trash burning increases the power consumption of the computer system without performing useful additional computations, which wastes energy and usually results in a needless increase in greenhouse gas emissions from a power plant.

Hence, what is needed is a technique for controlling temperature variations in a computer system without the above-described problems.

SUMMARY

One embodiment of the present invention provides a system for regulating temperature in a computer system. During operation, the system estimates a thermal trajectory as a function of time in at least a portion of the computer system. Then, the system modifies a flow resistance of a cooling mechanism in a thermal-regulation system in the computer system based on the estimated thermal trajectory, where the flow resistance is modified to regulate a temperature of at least the portion of the computer system.

In some embodiments, the thermal trajectory is estimated based on temperature measurements in at least the portion of the computer system. These temperature measurements may be performed using telemetry monitors in the computer system. Moreover, the temperature measurements may include temperature measurements in a set of time intervals.

In some embodiments, the thermal trajectory is estimated based on jobs that have executed on at least the portion of the computer system and/or additional jobs in a job queue of the computer system. For example, the thermal trajectory may be estimated based on an operational history of at least the portion of the computer system, where the operational history includes the executed jobs and associated temperature measurements.

In some embodiments, the flow resistance is modified using closed-loop feedback control.

In some embodiments, the cooling mechanism includes a fluid port of a forced-fluid driver in the computer system and the flow resistance corresponds to an iris opening (or aperture) of the fluid port. For example, the fluid port may include an air vent and the forced-fluid driver may include a fan.

Note that the temperature may be regulated while the forced-fluid driver operates at approximately a fixed forcing rate. This fixed forcing rate may correspond to an approximately fixed angular rotation rate of the forced-fluid driver. Alternatively, the temperature may be regulated while the forced-fluid driver operates at approximately one or more fixed forcing rates in a set of pre-determined fixed forcing rates. Moreover, a given fixed forcing rate in the one or more fixed forcing rates may correspond to approximately a given fixed angular rotation rate of the forced-fluid driver.

In some embodiments, the fixed forcing rate of the forced-fluid driver may be determined based on human perception of acoustics associated with the forced-fluid driver and/or based on reliability characteristics of the forced-fluid driver.

In some embodiments, a thermal cycling load corresponding to temperature variations in the computer system of 30 C is regulated by modifying the flow resistance, thereby approximately maintaining the temperature at a constant value.

In some embodiments, the flow resistance is modified by changing a viscosity of a magnetorheological fluid using a magnetic field.

In some embodiments, at least the portion of the computer system includes one or more processors.

Another embodiment provides a method which includes at least some of the aforementioned operations.

Another embodiment provides a computer-program product for use in conjunction with the system and/or the computer system, which includes instructions corresponding to at least some of the aforementioned operations.

Another embodiment provides the computer system.

BRIEF DESCRIPTION OF THE FIGURES

FIG. 5 is a block diagram illustrating an embodiment of a data structure in accordance with an embodiment of the present invention.

FIG. 6 is a block diagram illustrating an embodiment of a data structure in accordance with an embodiment of the present invention.

Note that like reference numerals refer to corresponding parts throughout the drawings.

DETAILED DESCRIPTION

Figure 1A:
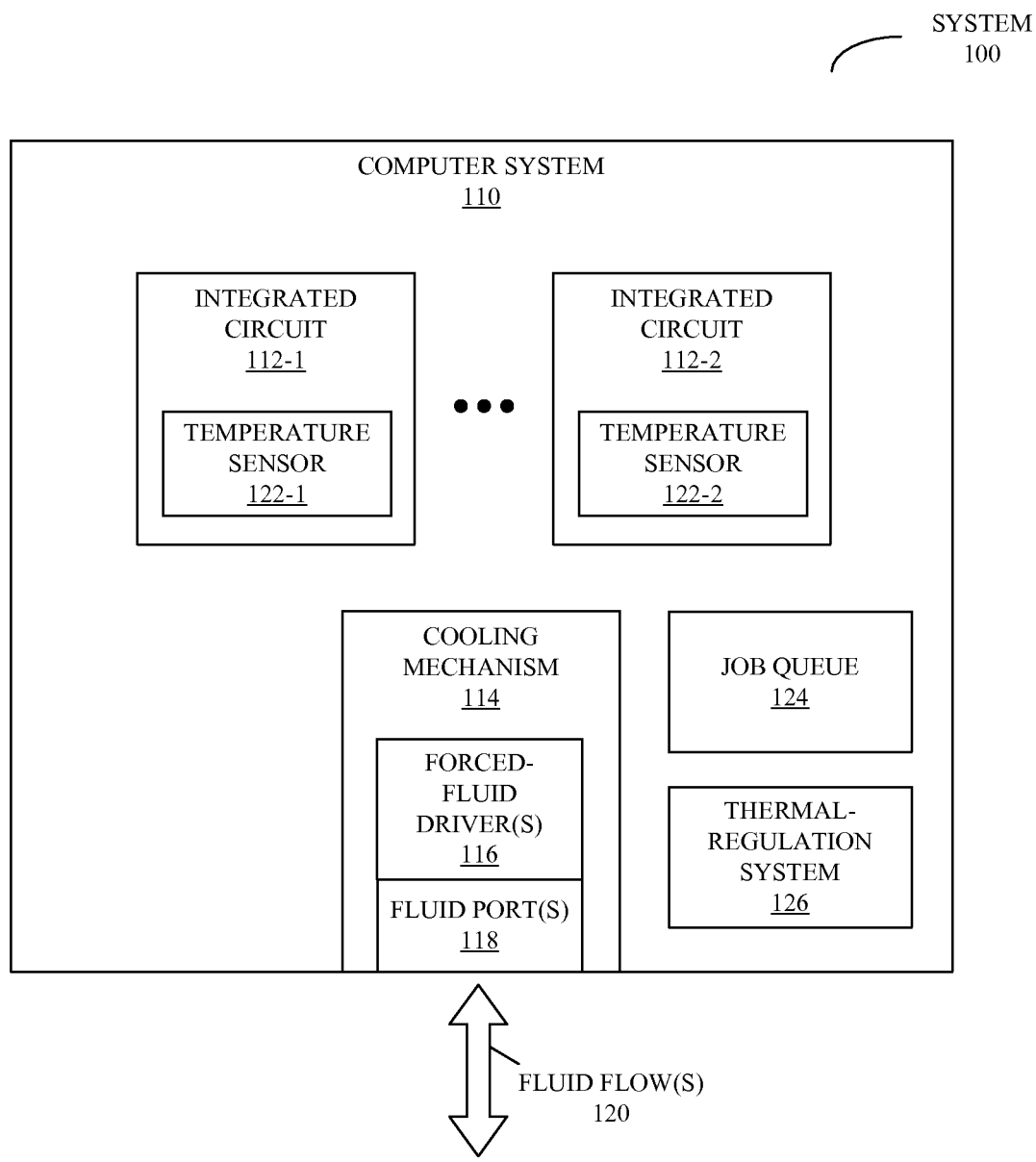
FIG. 1A is a block diagram illustrating a system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a system (such as a computer system), a method, and a computer-program product (i.e., software) for use with the system are described. These systems and processes may be used to estimate the thermal trajectory as a function of time in at least a portion of the computer system (such as one or more processors or processor cores). For example, the thermal trajectory may be based on temperature measurements performed using telemetry monitors in at least the portion of the computer system, jobs that have executed in at least the portion of the computer system and/or additional jobs in a job queue of the computer system. Then, the system may modify a flow resistance of a cooling mechanism in a thermal-regulation system in the computer system based on the estimated thermal trajectory in order to regulate a temperature of at least the portion of the computer system.

In some embodiments, the cooling mechanism includes a fluid port of a forced-fluid driver in the computer system and the flow resistance corresponds to an iris opening (or aperture) of the fluid port. For example, the fluid port may include an air vent and the forced-fluid driver may include a fan. Moreover, this technique may allow temperature in at least the portion of the computer system to be regulated while allowing the fan to operate at a fixed rotation speed (or at one of a set of fixed speeds), thereby improving fan reliability and acoustics (and reducing annoying sounds that are associated with varying fan speed).

By modifying the flow resistance, thermal cycling in the computer system, which is associated with dynamic variations in workload (such as jobs that have been executed or that will be executed) in at least the portion of the computer system, can be reduced, while maintaining throughput and without increasing the energy consumption of the computer system. In this way, the reliability, availability and/or serviceability of the computer system may be increased, thereby increasing the lifespan of the computer system and overall customer satisfaction.

Note that the computer system may include, but is not limited to: a server, a laptop computer, a personal computer, a work station, a mainframe computer, a blade, an enterprise computer, a data center and/or a portable-computing device.

Moreover, note that the system, such as the computer system, may be at one location or may be distributed over multiple, geographically dispersed locations. Consequently, instructions and/or data associated with measurements that are executed by the system may be received and communicated within the system over a network, such as: the Internet or World Wide Web (WWW), an intranet, a local area network (LAN) (such as IEEE 802.11 or WiFi), a wide area network (WAN) (such as IEEE 802.16 or WiMAX), a metropolitan area network (MAN), a satellite network, a wireless network (such as a cellular telephone network), an optical network, and/or a combination of networks or other technology enabling communication between computing systems or electronic devices.

In the discussion that follows, multivariate state estimation (MSET) refers to a class of regression techniques. For example, see [Gribok] "Use of Kernel Based Techniques for Sensor Validation in Nuclear Power Plants," by Andrei V. Gribok, J. Wesley Hines, and Robert E. Uhrig, The Third American Nuclear Society International Topical Meeting on Nuclear Plant Instrumentation and Control and Human-Machine Interface Technologies, Washington D.C., Nov. 13-17, 2000. This paper outlines several different regression approaches. Hence, the term MSET as used in this specification can refer to (among other things) any technique outlined in [Gribok], including: ordinary least squares (OLS), support vector machines (SVM), artificial neural networks (ANNs), MSET, or regularized MSET (RMSET).

We now describe embodiments of a system. FIG. 1A presents a block diagram illustrating a system 100 that controls temperature variations in a computer system 110. Computer system 110 includes one or more integrated circuits 112, such as one or more processors or processor cores, that generate heat during operation. These integrated circuits are thermally coupled to a cooling mechanism 114, which includes one or more forced-fluid drivers 116 and one or more fluid ports 118.

Cooling mechanism 114 may pump heat from an enclosed area in computer system 110 to an external environment. For example, forced-fluid drivers 116 may produce fluid flows 120 that flow out from and/or flow in to the enclosed area through the one or more fluid ports 118. In an exemplary embodiment, the forced-fluid drivers 116 each include at least one fan, the fluid flows 120 include a gas, such as air, and the fluid ports 118 include air vents (such as an air inlet and/or an air outlet). However, in other embodiments alternate fluid drivers are used. For example, the forced-fluid drivers 116 may include one or more pumps and the fluid flows 120 may include a liquid, such as water.

Moreover, there may be one or more telemetry monitors in computer system 110. For example, there may be one or more temperature sensors 122 (such as thermocouples or ring oscillators) on integrated circuits 112. As described further below with reference to FIG. 2, these telemetry monitors may perform continuous telemetry monitoring of one or more physical variables (such as temperature) and/or additional parameters (such as performance metrics) in at least a portion of computer system 110. For example, the temperature measurements may include temperature measurements in a set of time intervals.

Temperature measurements in one or more time intervals may be used to predict a thermal trajectory as a function of time of at least the portion of computer system 110. For example, the thermal trajectory may be estimated based on an operational history of at least the portion of the computer system 110, which includes executed jobs and associated temperature measurements, as well as pending jobs in a job queue 124. As described further below with reference to FIG. 2, in some embodiments the thermal trajectory may be determined by developing a regression model based on the temperature measurements, the executed jobs, and/or the additional telemetry signals. This analysis may be performed in the computer system 110 and/or in an external device.

Based on the estimated thermal trajectory, a thermal-regulation system 126 may control cooling mechanism 114 to reduce thermal cycling in the computer system 110 which is associated with customer workload variations (for example, by regulating the temperature of at least the portion of computer system 110). In particular, thermal-regulation system 126 may modify a flow resistance of one or more fluid ports 118 based on the estimated thermal trajectory. For example, the flow resistance of a given fluid port may be modified by varying the area or aperture of an iris opening of the given fluid port (as illustrated below with reference to FIG. 1B). Note that this temperature regulation may be achieved without decreasing the performance of the computer system 110 (such as the throughput) and/or without increasing the energy consumption of the computer system 110.

In some embodiments, the flow resistance is modified using closed-loop feedback control. For example, if the estimated temperature of at least the portion of the computer system 110 exceeds a target temperature by 10%, the area(s) of the iris opening(s) of one or more fluid ports 118 may be increased. Alternatively, if the estimated temperature of at least the portion of the computer system 110 is below a target temperature by 10%, the area(s) of the iris opening(s) of one or more fluid ports 118 may be decreased.

Note that the temperature may be regulated while the given forced-fluid driver operates at approximately a fixed forcing rate. This fixed forcing rate may correspond to an approximately fixed angular rotation rate or speed. Alternatively, the temperature may be regulated while the given forced-fluid driver operates at approximately one or more fixed forcing rates in a set of pre-determined fixed forcing rates, each of which corresponds to a given (approximately fixed) angular rotation rate or speed. However, this temperature regulation technique may also be used with forced-fluid drivers 116 that can operate at continuous (variable) forcing rates. In these embodiments, designers may chose to use the technique described here to operate these forced-fluid drivers 116 at a fixed forcing rate. By maintaining the angular rotation rate of the given forced-fluid driver at a constant value (or by limiting it to one of a set of pre-determined fixed forcing rates), this technique may increase the long-term reliability of the forced-fluid drivers 116 and may reduce human perception of acoustics associated with varying forced-fluid driver speeds (which can be irritating to customers).

Note that in some embodiments system 100 includes fewer or additional components. For example, integrated circuits 112 can be located on a single integrated-circuit board or on multiple integrated-circuit boards. Moreover, two or more components may be combined into a single component and/or a position of one or more components may be changed.

Figure 1B:
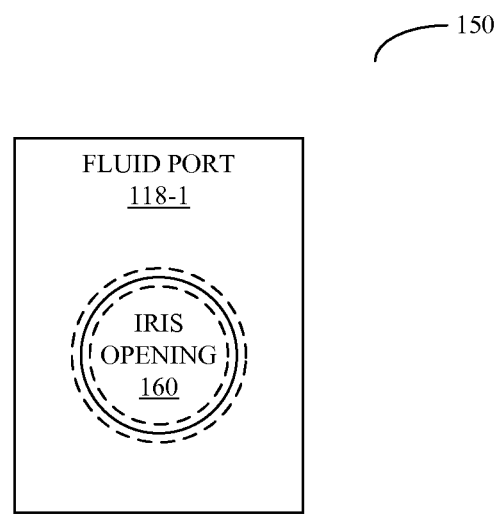
FIG. 1B is a block diagram illustrating an iris opening of a fluid port in accordance with an embodiment of the present invention.

FIG. 1B is a block diagram 150 illustrating an iris opening 160 of fluid port 118-1. As illustrated by the dashed lines, the cross-sectional area of iris opening 160 can be modified based on an estimated temperature of at least the portion of computer system 110 (FIG. 1A), thereby regulating the temperature.

Note that these modifications to the cross-sectional area of fluid port 118-1 may allow thermal-regulation system 126 (FIG. 1A) to accommodate large variations in the thermal cycle load. For example, by modifying the cross-sectional area of iris opening 160 in fluid port 118-1, the temperature in at least the portion of computer system 110 (FIG. 1A) may be approximately constant even when dynamic changes in the customer workload would otherwise result in temperature changes of up to 30 C. Said differently, by modifying the cross-sectional area of iris opening 160 in fluid port 118-1, the temperature in at least the portion of computer system 110 (FIG. 1A) may vary by up to 30 C. when the workload in at least the portion of computer system 110 (FIG. 1A) is constant.

Figure 2:
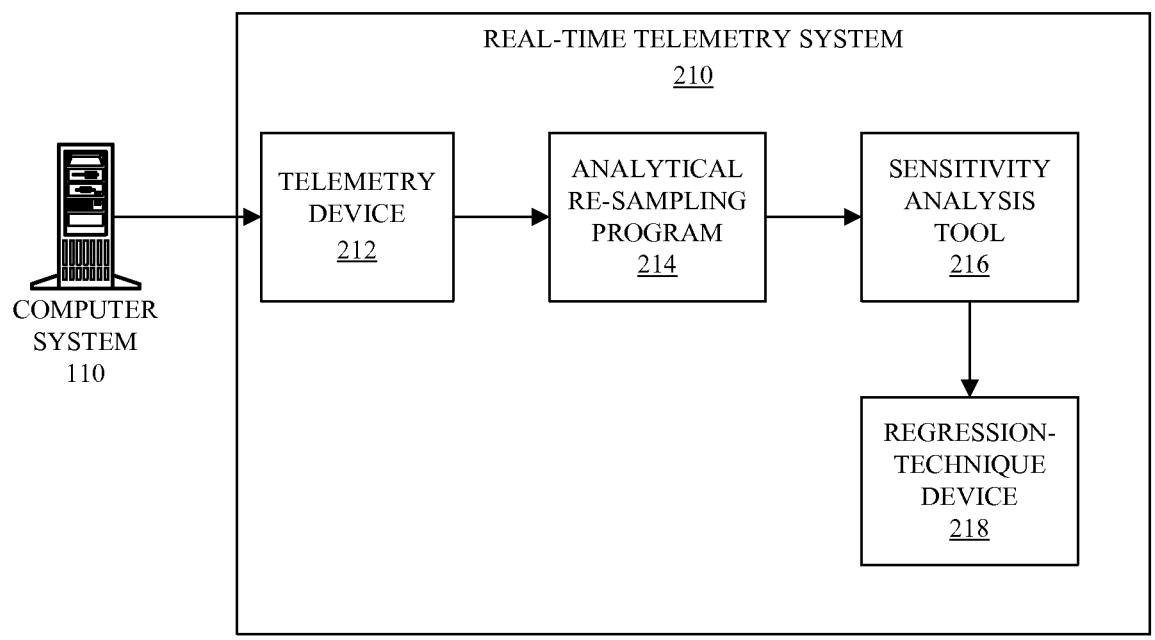
FIG. 2 is a block diagram illustrating a real-time telemetry system in accordance with an embodiment of the present invention.

We now discuss embodiments of a continuous-telemetry-monitoring system. FIG. 2 presents a block diagram of a real-time telemetry system 210 which monitors a computer system 110. This real-time telemetry system includes: telemetry device 212, analytical re-sampling program 214, sensitivity analysis tool 216, and/or regression-technique device 218 (which may use a regression technique, such as MSET and/or an autoregressive moving average technique based on a history-window time series of temperature measurements, to predict future temperatures in at least a portion of a computer system).

Telemetry device 212 may gather information (such as temperature measurements, and more generally, telemetry signals) from various sensors and monitoring tools within computer system 110 in real-time during operation of computer system 110. In some embodiments, measurements are performed: as needed, continuously, or when driven by an event (such as an interrupt). Note that the information gathered can include telemetry signals associated with internal performance parameters maintained by software within the computer system 110. For example, these internal performance parameters can include: system throughput, transaction latencies, queue lengths, load on one or more processors or processor cores, load on the memory, load on the cache, input/output (I/O) traffic, bus saturation metrics, first-in first-out (FIFO) overflow statistics, and various operational profiles gathered through 'virtual sensors' located within the operating system.

Moreover, the information can include telemetry signals associated with canary performance parameters for synthetic user transactions, which are periodically generated for the purpose of measuring quality of service from the end user's perspective. Additionally, the information may include hardware or physical variables, including, but not limited to: distributed internal temperatures, environmental variables (such as relative humidity, cumulative or differential vibrations within the computer system 110, acceleration, fan speed, acoustic signals, current noise, voltage noise, and/or time-domain reflectometry readings), and/or energy consumption (such as currents and voltages).

Then, real-time telemetry system 210 directs the telemetry signals to local or remote locations that contain analytical re-sampling program 214, sensitivity analysis tool 216, and regression-technique device 218. In some embodiments, analytical re-sampling program 214, sensitivity analysis tool 216, and regression-technique device 218 are located within computer system 110. However, in other embodiments analytical re-sampling program 214, sensitivity analysis tool 216, and/or regression-technique device 218 are located on a plurality of computer systems, including computer system 110 and/or other remote computer systems.

Note that analytical re-sampling program 214 ensures that the telemetry signals have a uniform sampling rate. In doing so, analytical re-sampling program 214 may use interpolation techniques, if necessary, to fill in missing data points, or to equalize the sampling intervals when the raw data is non-uniformly sampled.

After the telemetry signals pass through analytical re-sampling program 214, they may be aligned and correlated by sensitivity analysis tool 216. For example, in some embodiments sensitivity analysis tool 216 uses a moving window technique that 'slides' through the telemetry signals with systematically varying window widths. These sliding windows systematically vary the alignment between windows for different telemetry signals to optimize the degree of association between the telemetry signals, as quantified by an 'F-statistic,' which is computed and ranked for all telemetry signal windows by sensitivity analysis tool 216.

When statistically comparing the quality of two fits, F-statistics reveal the measure of regression. In particular, the higher the value of the F-statistic, the better the correlation between two telemetry signals. In some embodiments, the lead/lag value for the sliding window that results in the F-statistic with the highest value is chosen, and the candidate telemetry signal is aligned to maximize this value. This process may be repeated for each telemetry signal by sensitivity analysis tool 216.

Note that telemetry signals that have an F-statistic very close to 1 are 'completely correlated' and can be discarded. This may occur when two telemetry signals are measuring the same metric, but express them in different engineering units. For example, a telemetry signal can convey a temperature in Fahrenheit, while another telemetry signal may convey the same temperature in Centigrade. Since these two telemetry signals are perfectly correlated, one does not contain any additional information over the other, and therefore, one may be discarded.

Moreover, some telemetry signals may exhibit little correlation, or no correlation whatsoever. In this case, these telemetry signals may be dropped as they add little predictive value. Once a highly correlated subset of the telemetry signals has been determined, they may be combined into one group or cluster for processing by the regression-technique device 218. In particular, regression-technique device 218 may determine one or more inferential models based on this subset of the telemetry signals, such as inferential models that associate temperature measurements with jobs that have executed and/or that will execute in at least the portion of computer system 110. These inferential models may be used to predict a thermal trajectory in at least the portion of computer system 110, thereby facilitating temperature regulation, for example, by modifying a flow resistance of one or more fluid ports.

Note that the one or more inferential models may be determined during a training (or testing) mode and/or in real time as the telemetry signals are collected. For example, temperature measurements may be performed while a sequence of operations (such as a load script that includes one or more jobs) is executed in computer system 110. Then, the temperature measurements, as well as other telemetry signals, are received. Next, an inferential model may be determined by performing regression analysis on the received signals (in either the time domain and/or the frequency domain) using the regression technique.

In some embodiments, real-time telemetry system 210 includes fewer or additional components. Moreover, two or more components may be combined into a single component and/or a position of one or more components may be changed. In some embodiments the functionality of real-time telemetry system 210 is implemented more in hardware and less in software, or less in hardware and more in software, as is known in the art.

Figure 3:
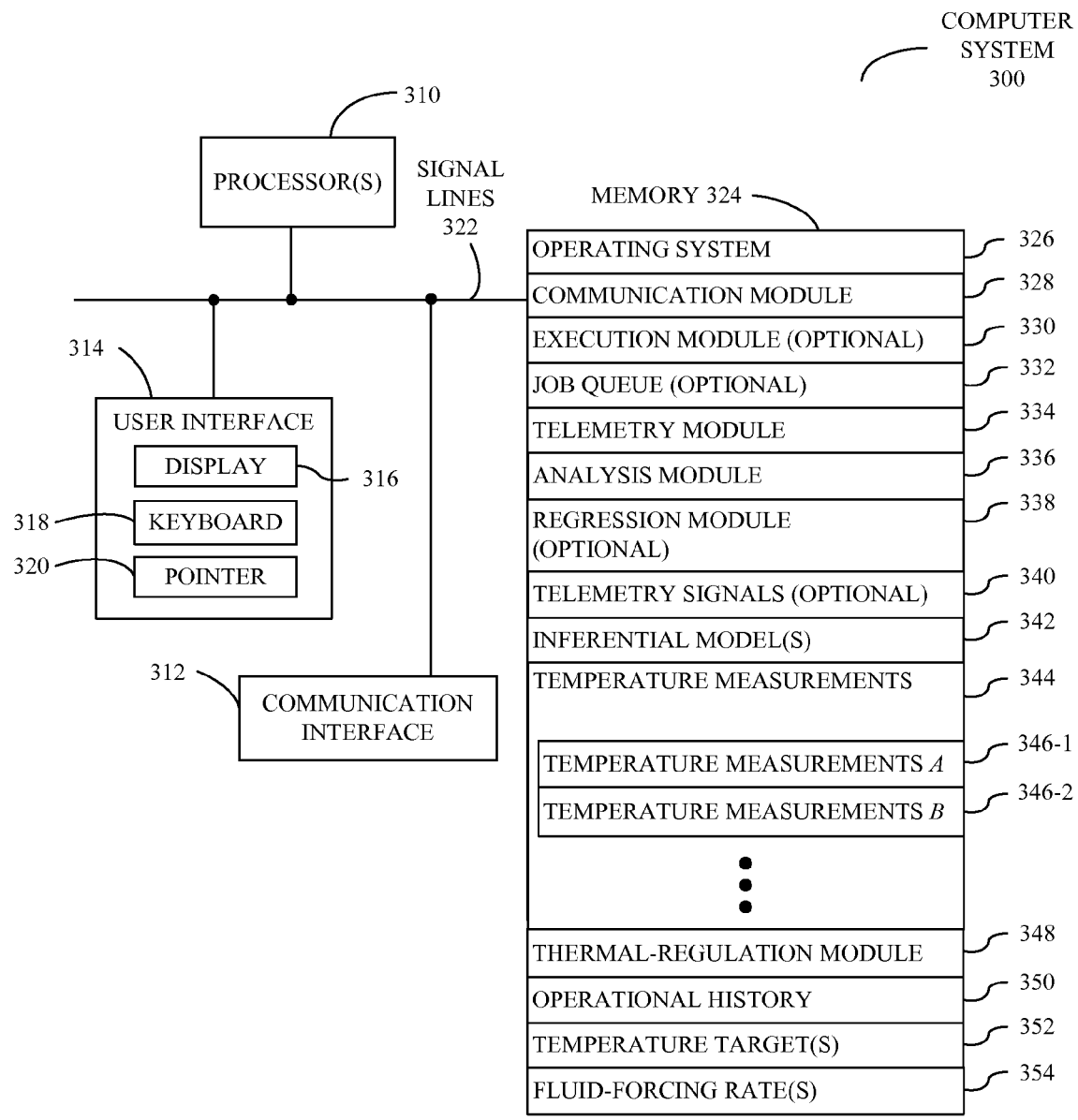
FIG. 3 is a block diagram illustrating a computer system in accordance with an embodiment of the present invention.

FIG. 3 presents a block diagram illustrating a computer system 300, such as the computer system 110 (FIGS. 1A and 2). Computer system 300 includes: one or more processors (or processor cores) 310, a communication interface 312, a user interface 314, and one or more signal lines 322 coupling these components together. Note that the one or more processors (or processor cores) 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in the computer system 300 may include volatile memory and/or non-volatile memory. More specifically, memory 324 may include: ROM, RAM, EPROM, EEPROM, flash, one or more smart cards, one or more magnetic disc storage devices, and/or one or more optical storage devices. Memory 324 may store an operating system 326 that includes procedures (or a set of instructions) for handling various basic system services for performing hardware-dependent tasks. Moreover, memory 324 may also store communication procedures (or a set of instructions) in a communication module 328. These communication procedures may be used for communicating with one or more computers, devices and/or servers, including computers, devices and/or servers that are remotely located with respect to the computer system 300.

Memory 324 may also include one or more program modules (or a set of instructions), including: optional execution module 330 (or a set of instructions), telemetry module 334 (or a set of instructions), analysis module 336 (or a set of instructions), optional regression module 338 (or a set of instructions), and/or thermal-regulation module 348. During operation of the computer system 300, telemetry module 334 may perform temperature measurements 344, such as temperature measurements A 346-1 or temperature measurements B 346-2, associated with one or more temperature sensors (such as temperature sensors 122 in FIG. 1A).

In some embodiments, optional execution module 330 performs one or more processes, such as one or more of the jobs in optional job queue 332, either before and/or during the temperature measurements 344. In this way, temperature measurements associated with a previous operation of computer system 300 may be determined.

After the temperature measurements 344 are received, analysis module 336 may analyze the temperature measurements 344 using optional regression module 338 to determine one or more inferential models 342 that can be used to predict a thermal trajectory of at least a portion of computer system 300. For example, a given inferential model may be determined based on temperature measurements 344 (such as a time series of temperature measurements), previously executed jobs in operational history 350, and/or pending jobs in optional job queue 332. Note that the one or more inferential models 342 may be determined during a training mode (e.g., previously) or during a monitoring mode (e.g., in real time).

In some embodiments, the given inferential model is also determined based on one or more optional telemetry signals 340. These optional telemetry signals 340 for one or more physical variables may be collected by telemetry module 334 using one or more physical sensors (which may be included on integrated circuits, such as processors 310).

Then, thermal-regulation module 348 may use one of the inferential models 342 to predict a future thermal trajectory of at least a portion of computer system 300 based on temperature measurements 344 and/or optional telemetry signals 340. If the predicted thermal trajectory deviates from one or more temperature targets 352, thermal-regulation module 348 may modify a flow resistance of a cooling mechanism, for example, by changing an iris opening (or an aperture) of a flow port, such as flow port 118-1 (FIG. 1B).

In some embodiments, thermal-regulation module 348 may also modify a forced-fluid rate of a fluid driver in the cooling mechanism based on the predicted thermal trajectory. Moreover, in some embodiments the forced-fluid rate of the fluid driver may be selected from one or more fixed fluid-forcing rates 354.

Instructions in the various modules in the memory 324 may be implemented in: a high-level procedural language, an object-oriented programming language, and/or in an assembly or machine language. The programming language may be compiled or interpreted, i.e., configurable or configured, to be executed by the one or more processors (or processor cores) 310.

Although the computer system 300 is illustrated as having a number of discrete components, FIG. 3 is intended to be a functional description of the various features that may be present in the computer system 300 rather than a structural schematic of the embodiments described herein. In practice, and as recognized by those of ordinary skill in the art, the functions of the computer system 300 may be distributed over a large number of servers or computers, with various groups of the servers or computers performing particular subsets of the functions. In some embodiments, some or all of the functionality of the computer system 300 may be implemented in one or more application-specific integrated circuits (ASICs) and/or one or more digital signal processors (DSPs).

Computer system 300 may include fewer components or additional components. Moreover, two or more components may be combined into a single component and/or a position of one or more components may be changed. In some embodiments the functionality of computer system 300 may be implemented more in hardware and less in software, or less in hardware and more in software, as is known in the art.

Figure 4:
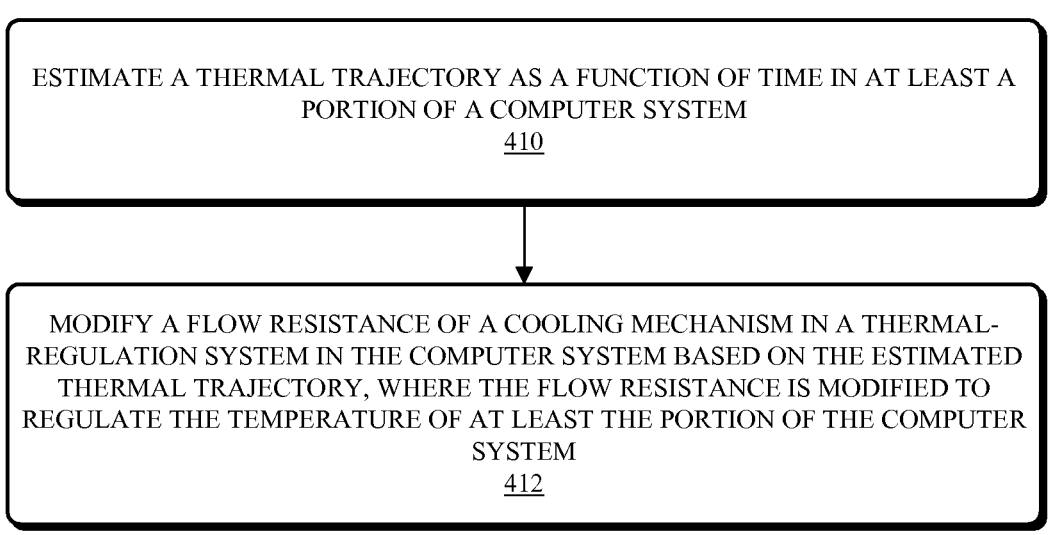
FIG. 4 is a flowchart illustrating a process for regulating temperature in a computer system in accordance with an embodiment of the present invention.

We now discuss embodiments of methods for regulating temperature in a computer system. FIG. 4 presents a flowchart illustrating a process 400 for regulating temperature in a computer system, which may be performed by a system. During operation, the system estimates a thermal trajectory as a function of time in at least a portion of the computer system (410). Then, the system modifies a flow resistance of a cooling mechanism in a thermal-regulation system in the computer system based on the estimated thermal trajectory (412), where the flow resistance is modified to regulate a temperature of at least the portion of the computer system.

In some embodiments of process 400 there may be additional or fewer operations. Moreover, the order of the operations may be changed and/or two or more operations may be combined into a single operation. Additionally, the preceding operations may be implemented using hardware and/or software, as is known in the art.

We now describe data structures for use in computer system 110 (FIG. 1A) and 300 (FIG. 3). FIG. 5 presents a block diagram illustrating an embodiment of a data structure 500. This data structure may include measurements 510. More specifically, a given instance of the measurements 510, such as measurements 510-1, may include multiple entries for: one or more time stamp(s) 512, one or more associated temperature sensors 514, one or more received temperature measurements 516, and/or one or more executed jobs 518.

FIG. 6 presents a block diagram illustrating an embodiment of a data structure 600. This data structure may include models 610. More specifically, a given instance of the models 610, such as model 610-1, may include multiple entries for: one or more portions of a computer system (such as one or more integrated circuits) 612, an operational history (which may include previously executed jobs and/or pending jobs in a job queue) 614, received temperature measurements 616, and/or one or more inferential models 618 (which may include coefficients in a regression expression that relates the operational history 614 and the received temperature measurements 616 to a predicted temperature.

Note that in some embodiments of the data structures 500 (FIG. 5) and 600 there may be fewer or additional components. Moreover, two or more components may be combined into a single component and/or a position of one or more components may be changed.

While the preceding embodiments modify the flow resistance of a cooling mechanism by changing an iris opening of a fluid port, in other embodiments a sheer strength or viscosity of a fluid may be changed. For example, the fluid that flows through the cooling mechanism may be a ferrofluid, and the viscosity may be changed by adjusting an applied magnetic field. More generally, the viscosity of a magnetorheological fluid may be changed by adjusting an applied magnetic field.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for regulating temperature in a computer system, comprising:

receiving a data structure that comprises temperature measurements, wherein the data structure maps each job in a set of previously executed jobs in an operational history for the computer system to at least one corresponding temperature measurement in the temperature measurements;

receiving a model that associates the temperature measurements with at least one of an internal performance parameter maintained by software within the computer system and a canary performance parameter for synthetic user transactions, wherein the model comprises one or more coefficients for a regression expression that relates the operational history and the temperature measurements to a predicted temperature;

using the model to estimate a thermal trajectory as a function of time in at least a portion of the computer system, wherein using the model to estimate the thermal trajectory comprises using at least some of the set of previously executed jobs and the corresponding temperature measurements to estimate the thermal trajectory for a set of pending jobs in a job queue for the computer system; and modifying a flow resistance of a cooling mechanism in a thermal-regulation system in the computer system based on the estimated thermal trajectory to regulate a temperature of at least the portion of the computer system.

2. The method of claim 1, wherein the temperature measurements are performed using telemetry monitors in the computer system.

3. The method of claim 1, wherein the temperature measurements include temperature measurements in a set of time intervals.

4. The method of claim 1, wherein the flow resistance is modified using closed-loop feedback control.

5. The method of claim 1, wherein the flow resistance is modified by changing a viscosity of a magnetorheological fluid using a magnetic field.

6. The method of claim 1, wherein a thermal cycling load corresponding to temperature variations in the computer system of 30 degrees Celsius is regulated by modifying the flow resistance, thereby approximately maintaining the temperature at a constant value.

7. The method of claim 1, wherein each of the at least one corresponding temperature measurement in the temperature measurements was taken while the corresponding previously executed job was executing, and
   wherein using the at least some of the set of previously executed jobs and the corresponding temperature measurements to estimate the thermal trajectory comprises:
      using the data structure to map the pending jobs to the previously executed jobs; and
      using the temperature measurements corresponding to the mapped previously executed jobs to estimate the thermal trajectory for the set of pending jobs.

8. The method of claim 1, wherein the cooling mechanism includes a fluid port of a forced-fluid driver in the computer system and wherein the flow resistance corresponds to a cross-sectional area of a circular iris opening of the fluid port.

9. The method of claim 8, wherein the fluid port includes an air vent and the forced-fluid driver includes a fan.

10. The method of claim 8, wherein the temperature is regulated while the forced-fluid driver operates at approximately a fixed forcing rate.

11. The method of claim 10, wherein the fixed forcing rate corresponds to an approximately fixed angular rotation rate of the forced-fluid driver.

12. The method of claim 10, wherein the fixed forcing rate of the forced-fluid driver is determined based on reliability characteristics of the forced-fluid driver.

13. The method of claim 8, wherein the temperature is regulated while the forced-fluid driver operates at approximately one or more fixed forcing rates in a set of pre-determined fixed forcing rates.

14. The method of claim 13, wherein a given fixed forcing rate in the one or more fixed forcing rates corresponds to approximately a fixed angular rotation rate of the forced-fluid driver.

15. A computer-program product for use in conjunction with a computer system, the computer-program product comprising a non-transitory computer-readable storage medium and a computer-program mechanism embedded therein for configuring the computer system, the computer-program mechanism including:
   instructions for receiving a data structure that comprises temperature measurements, wherein the data structure maps each job in a set of previously executed jobs in an operational history for the computer system to at least one corresponding temperature measurement in the temperature measurements;
   instructions for receiving a model that associates temperature measurements with at least one of an internal performance parameter maintained by software within the computer system and a canary performance parameter for synthetic user transactions, wherein the model comprises one or more coefficients for a regression expression that relates the operational history and the temperature measurements to a predicted temperature;
   instructions for using the model to estimate a thermal trajectory as a function of time in at least a portion of the computer system, wherein using the model to estimate the thermal trajectory comprises using at least some of the set of previously executed jobs and the corresponding temperature measurements to estimate the thermal trajectory for a set of pending jobs in a job queue for the computer system; and
   instructions for modifying a flow resistance of a cooling mechanism in a thermal-regulation system in the computer system based on the estimated thermal trajectory to regulate a temperature of at least the portion of the computer system.

16. A computer system, comprising:
a processor;
memory;
a program module, wherein the program module is stored in the memory and configured to be executed by the processor, the program module including:
   instructions for receiving a data structure that comprises temperature measurements, wherein the data structure maps each job in a set of previously executed jobs in an operational history for the computer system to at least one corresponding temperature measurement in the temperature measurements;
   instructions for receiving a model that associates temperature measurements with at least one of an internal performance parameter maintained by software within the computer system and a canary performance parameter for synthetic user transactions, wherein the model comprises one or more coefficients for a regression expression that relates the operational history and the temperature measurements to a predicted temperature;
   instructions for using the model to estimate a thermal trajectory as a function of time in at least a portion of the computer system, wherein using the model to estimate the thermal trajectory comprises using at least some of the set of previously executed jobs and the corresponding temperature measurements to estimate the thermal trajectory for a set of pending jobs in a job queue for the computer system; and
   instructions for modifying a flow resistance of a cooling mechanism in a thermal-regulation system in the computer system based on the estimated thermal trajectory to regulate a temperature of at least the portion of the computer system.

* * * * *